Sept. 8, 1964 J. A. HERRMANN 3,148,008

DOUBLE FINGER PLUG ADAPTER

Filed May 1, 1961 5 Sheets-Sheet 1

INVENTOR.
JOHN A. HERRMANN

BY
OSTROLENK, FABER, GERB & SOFFEN

ATTORNEYS

Sept. 8, 1964 J. A. HERRMANN 3,148,008

DOUBLE FINGER PLUG ADAPTER

Filed May 1, 1961

5 Sheets-Sheet 2

INVENTOR.
JOHN A. HERRMANN

BY
OSTROLENK, FABER, GERB & SOFFEN

ATTORNEYS

Sept. 8, 1964 J. A. HERRMANN 3,148,008

DOUBLE FINGER PLUG ADAPTER

Filed May 1, 1961 5 Sheets-Sheet 3

INVENTOR.
JOHN A. HERRMANN

BY
OSTROLENK, FABER, GERB & SOFFEN

ATTORNEYS

Sept. 8, 1964 J. A. HERRMANN 3,148,008

DOUBLE FINGER PLUG ADAPTER

Filed May 1, 1961 5 Sheets-Sheet 4

INVENTOR.
JOHN A. HERRMANN

BY
OSTROLENK, FABER, GERB & SOFFEN

ATTORNEYS

Sept. 8, 1964 J. A. HERRMANN 3,148,008

DOUBLE FINGER PLUG ADAPTER

Filed May 1, 1961 5 Sheets-Sheet 5

INVENTOR.
JOHN A. HERRMANN

BY
OSTROLENK, FABER, GERB & SOFFEN

ATTORNEYS

3,148,008
DOUBLE FINGER PLUG ADAPTER

John A. Herrmann, Grosse Pointe Farms, Mich., assignor to I-T-E Circuit Breaker Company, Philadelphia, Pa., a corporation of Pennsylvania Filed May 1, 1961, Ser. No. 106,622
6 Claims. (Cl. 339—22)

This invention relates to bus duct plugs in general and more particularly to a novel arrangement for tapping power from a bus duct, by means of a single plug, at a magnitude or rating for each which exceeds the current carrying rating of a single plug finger.

In general, bus duct comprises a plurality of parallel spaced conductors extending longitudinally through an elongated housing. The housing is provided with longitudinally spaced openings through which the fingers of a plug extend to tap power from the bus duct. A power tapping plug connectible to the duct is provided with one contact finger for each bus duct conductor.

While the bus duct conductors may have a given current carrying capacity the means for making contact between the plug fingers and the bus conductors is such that the current rating of each plug is considerably less than the current rating of the bus duct. Quite often it is desirable to utilize a single plug to tap current of a higher value than is available by virtue of the rating limitation imposed because of the contact resistance between the plug fingers and the bus conductors.

This invention provides a plug whose current carrying capacity is greater than the current carrying capacity obtainable by means of single finger contact with each of the bus duct conductors. Briefly, this invention provides a plug which includes two contact fingers per pole. The fingers are interconnected by a conducting strap and are so positioned that they enter the bus duct housing through different openings thereof to engage a single bus bar.

In conventional bus duct constructions each of the bus duct housing openings are provided with slideable covers which are maintained in closed position except when plugs are installed at the openings. The the instant invention provides an adapter constructed in such a manner that it serves as a mounting means for the plug and, more important, eliminates the possibility of plugging in one finger of a phase while the cover blocks engagement of the other finger of that phase with the bus duct conductor.

This is accomplished by providing the adapters with a pair of ears which are received by apertures in the duct housing only when two adjacent covers are open. Unless the ears are disposed within these openings the adapter cannot be properly seated on the bus duct housing. Once the adapted is seated on the housing the ears prevent closing of the covers so that a door cannot engage the plug fingers.

Accordingly, a primary object of this invention is to provide a novel construction whereby a single plug may be utilized to tap current of a magnitude which exceeds the current carrying rating established because of limitations imposed by the resistance of a single finger in contact with a bus conductor.

Another object is to provide a novel construction of this type which eliminates the use of special tools to make the contact, maintains proper phasing, and results in good electrical contact between the plug fingers and the bus duct conductors.

Still another object is to provide a construction of this type which enables inexperienced personnel to connect the plug to the duct.

A still further object is to provide means for adequately supporting a large and heavy plug and also eliminate the possibility of plugging in until such time as the appropriate bus duct housing covers are open.

A still further object is to provide a construction of this type including means for lining up the plug in proper longitudinal position for plugging-in and also to provide means for grounding the plug to the duct before electrical contact is made.

These as well as other objects of this invention shall become readily apparent after reading the following description of the accompanying drawings in which.

Now referring to the figures, this invention comprises a combination of three main elements, bus duct 10, adapter 11 and plug-in unit 12, each of which will be described in detail hereinafter. Adapter 11 is first mounted to bus duct 10 and thereafter plug 12 is mounted to adapter 11. The latter serves as a support means for plug 12, positions the latter with respect to bus duct 10 and assures that the appropriate openings in bus duct 10 are uncovered to receive the fingers of plug 12.

Figure 6:
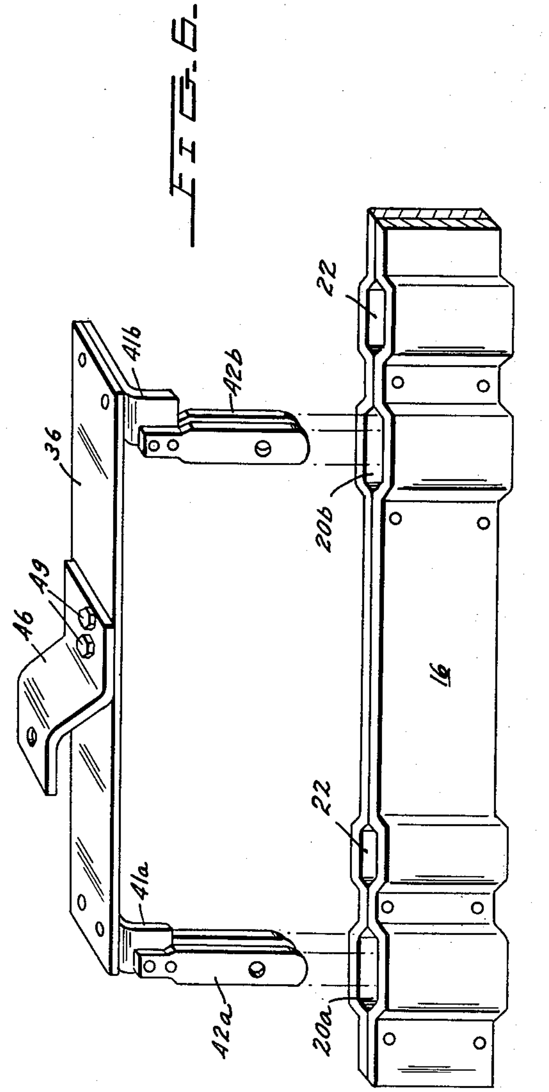
FIGURE 6 is an exploded perspective illustrating the manner in which the fingers of each plug phase engage a single bus conductor.
Figure 5:
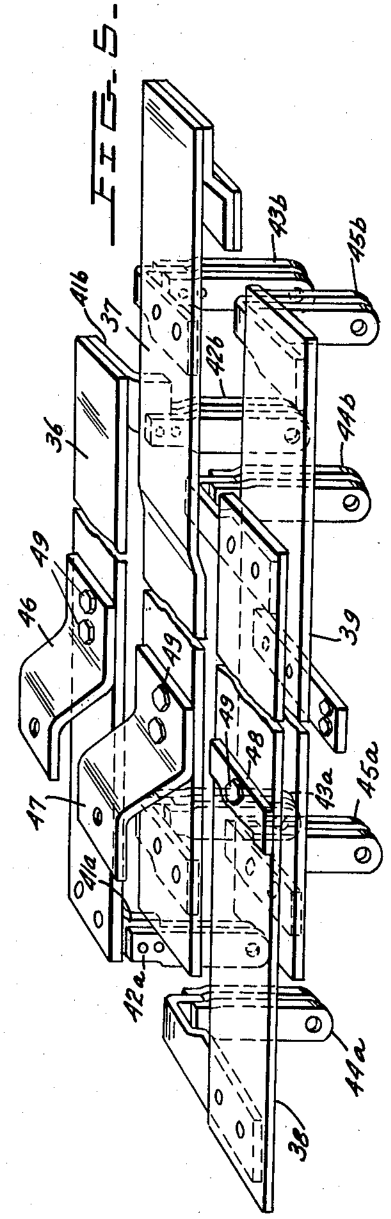
FIGURE 5 is an exploded perspective of the contact fingers, tie straps and jumper straps of the plug of FIGURE 2.
Figure 7:
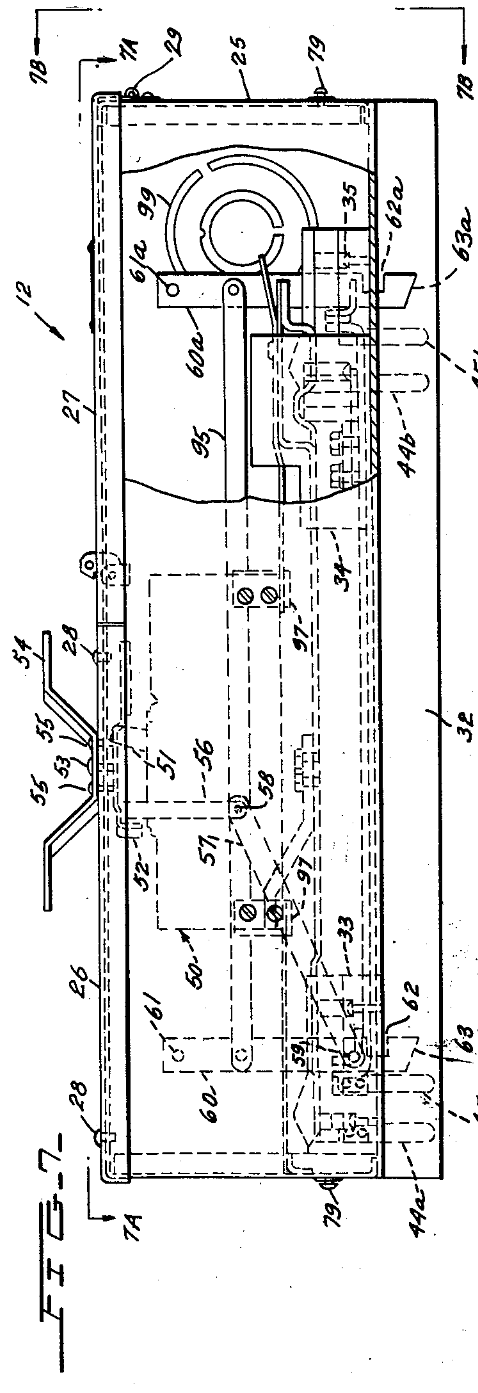
FIGURE 7 is a side elevation of the plug of FIGURE 2.
Figure 7A:
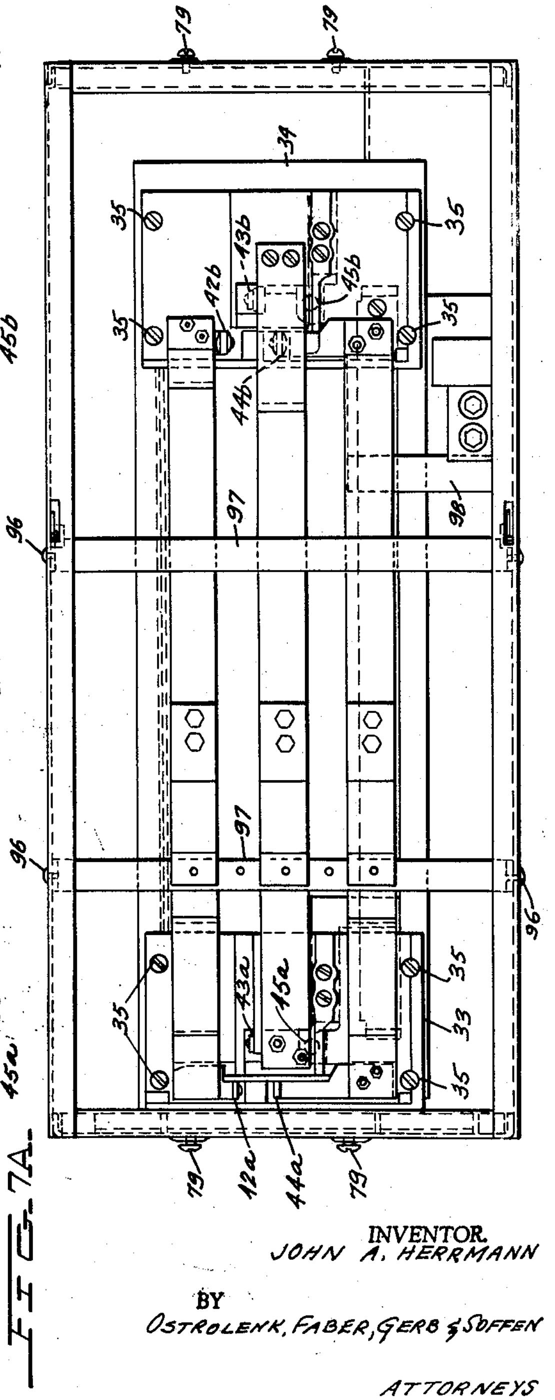

Bus duct 10 is of the type described in detail in my copending application Serial No. 7,810 filed February 10, 1960, entitled "Bus Duct Having Stacked Bus Bars," with John B. Cataldo as inventor and assigned to the assignee of the instant invention. Briefly, bus duct 10 comprises elongated housing 13 wherein laminated bus bars 14–17 are maintained in spaced parallel relationship. An insulating covering 18 is provided for each of the bus bars 14–17 with the coverings 18 having appropriately positioned apertures 19 aligned with finger receiving pockets 20 of the bus bars 14–17. As best seen in FIGURE 6, bus bar 16, as do all the other bus bars, include finger receiving pockets 20*a*, 20*b*, etc. spaced along the lengths thereof with each of the finger receiving pockets being disposed in alignment with an opening 21 of housing 13. In this case pockets 20*a*, 20*b* are aligned with openings 21*a*, 21*b*, respectively. An expansion pocket 22 is provided close to each of the finger receiving pockets 20.

Plug 12 comprises rectangular case 25 having a two section back cover 26, 27. Section 26 is intended to remain closed, being held in position by screw means 28, while section 27 is readily openable being pivoted at hinge means 29 to one end of case 25. Case 25 is provided with spaced forwardly extending flanges 31, 32 which straddle housing 13 of duct 10 when plug 12 is mounted to duct 10.

Disposed within case 25 at opposite ends thereof are spaced apart insulating blocks 33, 34 which are secured to the front wall of case 25 by screws 35. Tie straps 36–39 extend between insulating blocks 33, 34 being disposed with appropriately shaped recesses thereof so as to be insulated from each other. Screws 40 extend through appropriate apertures of blocks 33, 34 to secure tie straps 36–39 to blocks 33, 34.

Tie straps 36 at opposite ends thereof is provided with offset extensions 41*a*, 41*b*. Individual pairs of parallel elements mounted to opposite sides of members 41*a*, 41*b* cooperate to form contact fingers 42*a*, 42*b*, respectively. In a similar manner contact fingers 43*a*, 43*b* are secured to opposite ends of tie strap 37, contact fingers 44*a*, 44*b* are secured to opposite ends of tie strap 38 and contact fingers 45*a*, 45*b* are secured to opposite ends of tie strap 39 which is usually grounded.

Tie straps 36–38 are positioned in the same plane and are provided with offset jumper straps 46–48, respectively. Bolts 49 secure one of the ends of each jumper strap 46–48 to the respective tie straps 36–38, while the other ends of jumper straps 46–48 are secured to the line terminals (not shown) of molded case circuit interrupter 50 in a manner well known to the art. Load conductors (not shown) extendable through case knockout 99 are connectable to the load terminals (not shown) of circuit breaker 50 as well as to neutral bar terminal 98. Parallel struts 97 extend between the sides of case 25 being secured thereto by screws 96. Circuit breaker 50 spans the space between struts 97 being secured thereto by screw means (not shown).

Circuit interrupter 50 is of a type fully described in U.S. Patent 2,932,706 and is provided with operating handle 51 which is engageable for operation thereof by bracket means 52 pivotally mounted to the inside of cover section 26 at rivet 53. Control handle 54 is mounted by rivet 53 external of cover section 26. Screws 55, extending through appropriate arcuate apertures (not shown) of cover section 26, connect bracket 52 to control handle 54 for operation in unison therewith. In this manner circuit breaker handle 51 is operable by means external of plug case 25.

Forward extension 56, at the free end thereof, is connected to one end of link 57 at pivot 58. The other end of link 57 is connected at pivot 59 to interlock member 60 which is pivoted to case 25 at pin 61. As in fully explained in the Cataldo et al. copending application Serial No. 851,776, filed November 9, 1959, entitled "Safety Bus Duct Plug," and assigned to the assignee of the instant invention, interlock member 60 is provided with notch 62 which is positioned to receive a portion of duct housing 13 adjacent to opening 21 whenever the contacts of circuit breaker 50 are engaged. Further, tip 63 of interlock member 60 is so positioned that when the contacts of circuit breaker 50 are in engagement, plug 12 cannot be mounted to duct 10 because finger tip 63 will engage duct housing 13 prior to engagement of contact fingers 41*a*–45*a* with the bus bars of duct 10.

Also provided is a second interlock finger 60*a* pivoted to case 25 at 61*a*. Connecting link 95, pivotally connected at one of its ends to member 60 and at the other of its ends to member 60*a*, connects interlock members 60, 60*a* for operation in unison with each other.

Figures 3, 3A, 4:
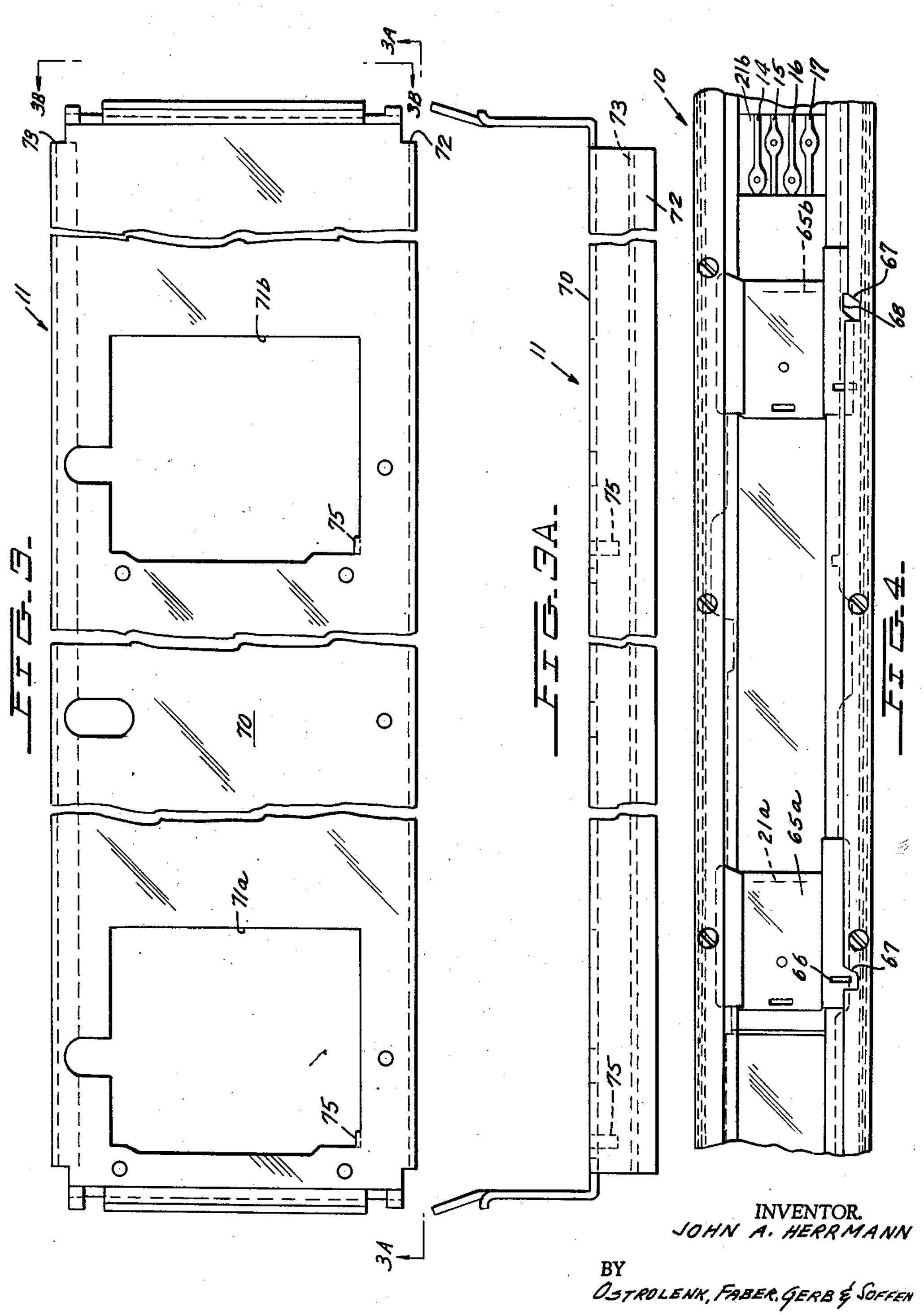
FIGURE 3 is a plan view of the adapter.
FIGURES 3A and 3B are end views of the adapter looking in the direction of arrows 3A—3A and 3B—3B, respectively.
FIGURE 4 is a fragmentary side elevation of a bus duct run in which one of the plug-in openings is uncovered while the plug-in opening adjacent thereto is covered.
Figure 8:
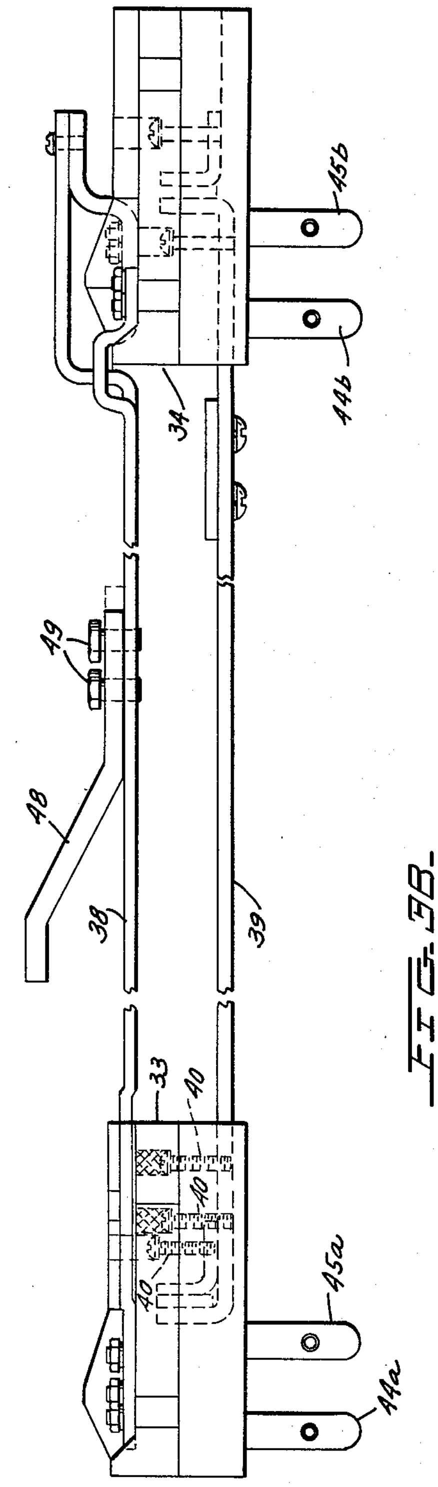
FIGURE 8 is a side elevation of the plug fingers, tie straps, jumper straps and positioning insulators of the plug of FIGURE 2.
Figure 7B:
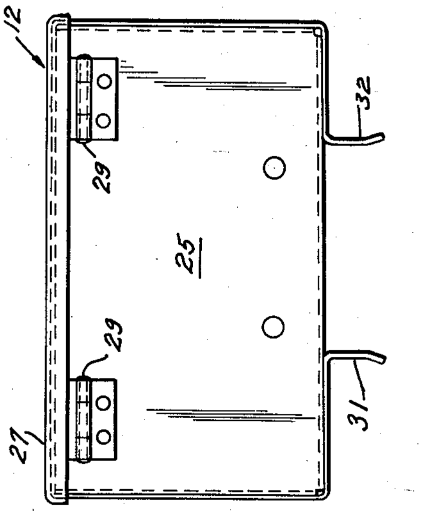
FIGURES 7A and 7B are plan and end views, respectively, of the plug looking in the direction of arrows 7A—7A and 7B—7B, respectively. In the illustration of FIGURE 7A the plug cover as well as the load break switch have been removed from the plug.

As fully described in the aforesaid copending application 851,776, sliding covers 65*a*, 65*b* are provided for housing openings 21*a*, 21*b*. As seen in FIGURE 4, cover 65*a* is closed while cover 65*b* is open. With cover 65*a* closed vertical slot 66 thereof is in alignment with housing notch 67. In the open position of cover 65*b*, substantially the entire portion of the generally horizontal notch 68 in cover 65*b* is in alignment with housing notch 67. Thus, it is seen that with the aperture cover closed a generally vertical through passage is available in the region of the respective finger opening while with the cover open a generally horizontal aperture is available in the finger opening in question, both for reasons to be hereinafter explained.

Adapter 11 is included to provide means for securing plug 12 to bus duct 10. Adapter 11 also provides means for the longitudinal positioning of plug 12 with respect to bus duct 10 and to assure that two adjacent covers 65 are both open prior to an attempt to mount plug 12 to bus duct 10.

Figure 3B:
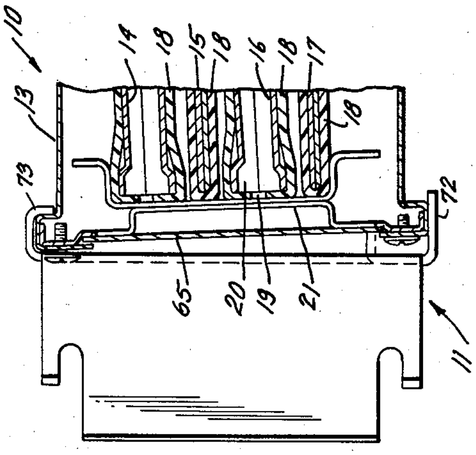

As best seen in FIGURES 3–3B, adapter 11 is constructed of sheet material having main body portion 70 which is a materially elongated rectangle having generally rectangular apertures 71*a*, 71*b* positioned to be in alignment with duct housing apertures 21*a*, 21*b*, respectively, when adapter 11 is mounted to bus duct. The long edges of body 70 are provided with forwardly extending flanges 72, 73 with the upper flange having a generally hooked shape for engagement with formation 74 which extends along the upper edge of bus duct housing 13 as best seen in FIGURES 1A and 3B.

Ears 75 extend forwardly of body 70 at the corners of each of the apertures 71*a*, 71*b* being appropriately positioned to be received by the through passages formed when notches 67, 68 are in alignment (when covers 65*a*, 65*b* are open). It is to be noted that ears 75 are shaped such that they cannot pass through vertical cover slots 66.

Figures 1, 1A, 2, 2A:
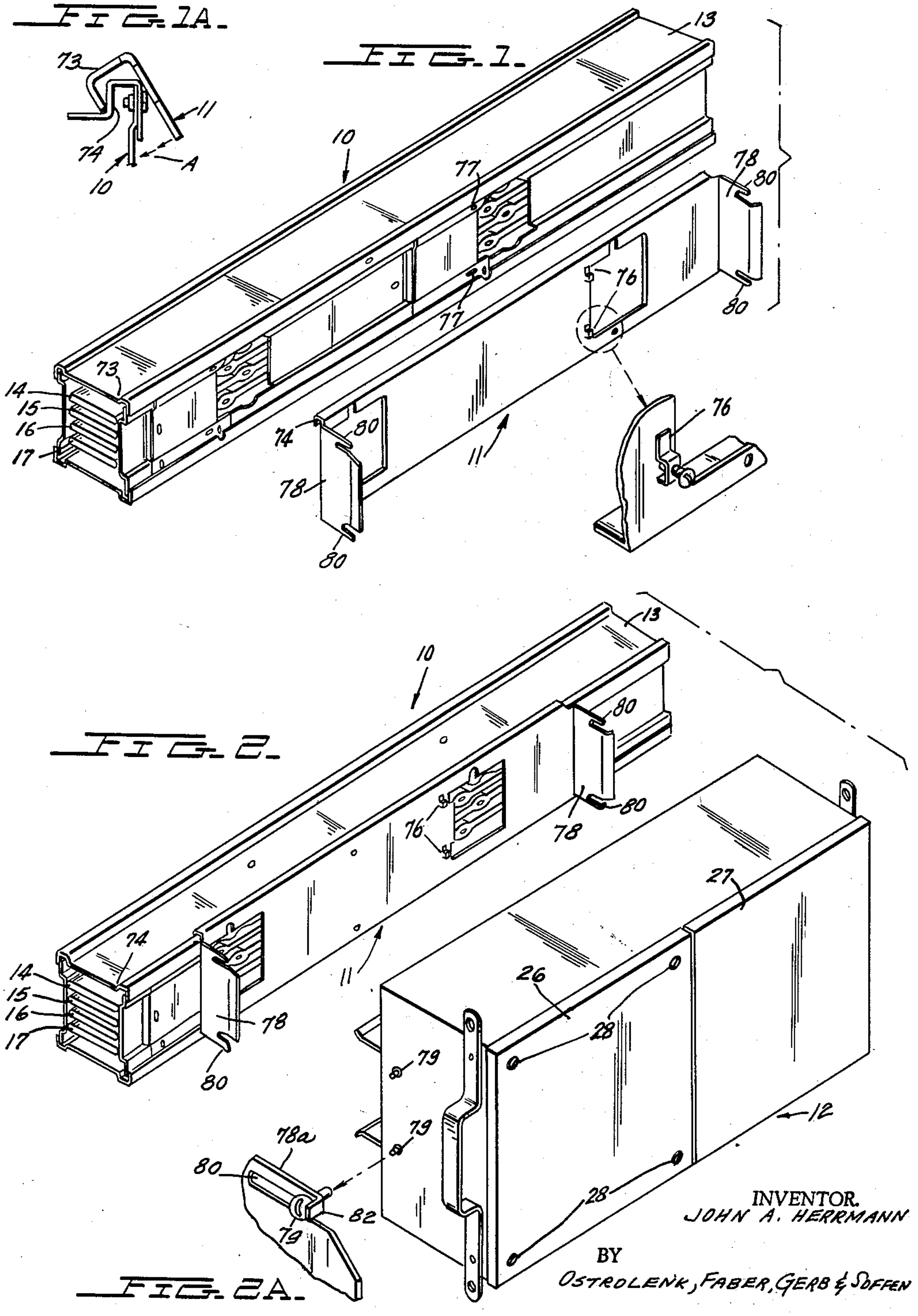
FIGURE 1 is an exploded perspective of an adapter and a portion of a bus duct run.
FIGURE 1A is an enlarged fragmentary view illustrating the adapter as it is being moved toward final mounting position on the bus duct housing.
FIGURE 2 is an exploded perspective in which the elements of FIGURE 1 are assembled and the plug is shown prior to mounting thereof.
FIGURE 2A is an enlarged fragmentary perspective illustrating the cooperation of the adapter and the screws for securing the plug to the adapter.

Adapter 11 is mounted to bus duct 10 by hooking flange 73 thereof over bus duct housing formation 74 and thereafter pivoting adapter 11 in the direction indicated by arrow A in FIGURE 1A. If adjacent covers 65*a*, 65*b* are both open and adapter 11 is appropriately positioned along the length of bus duct 10 ears 75 are received by the through passages 67, 68 and adapter 11 is pivotable into final mounting position wherein body 70 is substantially parallel to covers 65*a*, 65*b*. Adapter 11 is securely fastened to bus duct housing 13 by means of captive screws 76 which are received by threaded apertures 77 in duct housing 13. It is to be noted that with adapter 11 in final mounting position on bus duct housing 13, covers 65*a*, 65*b* cannot be moved to closed position. Thus, adapter 11 cannot be mounted to duct 10 unless two adjacent covers are both open and so long as adapter 11 is mounted to duct 10 neither of these covers can be closed.

Adapter 11 is also provided with end flanges 78 which extend rearwardly therefrom. Flanges 78 are spaced apart by approximately the length of plug case 25. Plug 12 is mountable to adapter 11 by first loosening captive screws 79 in the ends of plug case 25 and entering the threaded bodies of these screws into parallel slots 80 in end flanges 78. Flanges 78 are outwardly flared at the free ends thereof to assist in the entry of plug case 12, 25 therebetween.

As plug 12 is moved forward the contact fingers thereof enter the appropriate bus bar pockets for electrical engagement with the conductors of bus duct 10. After moving plug 12 as far forward as possible captive screws 79 are tightened against end flanges 70 to securely fasten plug 12 to adapter 11. As best seen in FIGURE 2A flange portions 78*a* forming screw receiving slots 80 have end portions 82 extending at right angles from flanges 78 to act as means for preventing plug 12 from becoming entirely free of adapter 11 even if holding screws 79 should loosen. That is, portions 82 are positioned in the paths of the heads of screws 79 except when these screws are as loose as possible.

Thus, this invention provides a novel bus duct plug having two sets of contact fingers with the sets being so positioned that one finger from each set will engage the same bus duct conductor when the plug is mounted to the bus duct. This invention also provides a novel adapter which assures that none of the plug fingers can engage the bus duct conductors unless there are two open apertures in the bus duct housing to receive both sets of plug fingers. In addition, the adapter prevents closing of a bus duct housing cover while the plug is mounted to the bus duct. It also provides means for securing the large plug to the duct.

Although I have here described preferred embodiments of my novel invention, many variations and modifications will now be apparent to those skilled in the art, and I therefore prefer to be limited not by the specific disclosure herein but only by the appending claims.

I claim:

1. The combination comprising a bus duct and a plug operatively mounted thereto, said bus duct comprising an elongated housing and a plurality of spaced parallel bus bars within said housing extending parallel to the axis thereof; said housing having a plurality of longitudinally spaced openings through which a group of plug fingers may be extended to engage said bus bars; said plug comprising a case having aperture means in a surface thereof, a first and a second group each comprising a plurality of contact fingers, insulating means within said case operatively positioning said fingers, said fingers of said first group fingers extending through said aperture means and a first of said openings; said second group fingers extending through said aperture means and a second of said openings; individual ones of said fingers of each of said groups engaging individual ones of said bus bars; jumper means within said case connecting the longitudinally spaced individual fingers of said first and said second groups which are in engagement with the same bus bar; an adapter means secured to said housing and having said case secured thereto; said adapter means having opening means in alignment with said opening and having said fingers extending therethrough; a first and a second openable cover for said first and said second openings, respectively; said adapter means comprising a body having a first and a second forwardly extending ear disposed within a first and a second formation of said housing; said ears being operatively positioned to prevent closing of said covers; said covers, when not fully open, being operatively positioned to block entry of said ears into said formations to thereby prevent said adapter means from being secured to said housing.

2. The combination of claim 1 in which the adapter means also comprises rearwardly extending end flanges having outwardly flared ends; said case being positioned between said end flanges; mechanical securing means in engagement with said end flanges and end portions of said case for securing said case to said adapter means.

3. The combination of claim 2 in which the adapter means further comprises a forwardly extending hook-shaped side flange in operative engagement with a formation of said housing to form a pivotal axis for said adapter means with respect to said housing.

4. The combination of claim 2 in which the mechanical securing means comprises screws threaded to said end portions with the heads of said screws positioned outboard of said case; said end flanges having elongated open ended guide slots with the bodies of said screws disposed therein.

5. The combination of claim 4 in which the end flanges include means positioned to engage said heads and thereby prevent said screws from leaving said slots through the open ends thereof unless at least predetermined portions of said screws are withdrawn from said end portions.

6. The combination comprising a bus duct and a plug operatively mounted thereto, said bus duct comprising an elongated housing and a plurality of spaced parallel bus bars within said housing extending parallel to the axis thereof; the longitudinal extent of said plug being substantially less than the longitudinal extent of said bus duct; said housing having a plurality of longitudinally spaced openings through which a group of plug fingers may be extended to engage said bus bars; said plug comprising a case having aperture means in a surface thereof, a first and a second group each comprising a plurality of contact fingers, insulating means within said case operatively positioning said fingers, said fingers of said first group fingers extending through said aperture means and a first of said openings; said second group fingers extending through said aperture means and a second of said openings; individual ones of said fingers of each of said groups engaging individual ones of said bus bars; jumper means within said case connecting the longitudinally spaced individual fingers of said first and said second groups which are in engagement with the same bus bar; a first and second openable cover for said first and second openings, respectively; register means operatively positioned to prevent installation of said plug to said bus duct when said covers are not fully opened; means preventing the closing of said covers when said plug is installed.

References Cited in the file of this patent

UNITED STATES PATENTS

| | | |
|---|---|---|
| 2,725,541 | Born et al. | Nov. 29, 1955 |
| 2,792,557 | Dowick | May 14, 1957 |
| 2,792,561 | Cohen | May 14, 1957 |
| 2,968,781 | Staskowski | Jan. 17, 1961 |
| 3,009,011 | Fisher | Nov. 14, 1961 |